United States Patent
Esser et al.

(10) Patent No.: US 9,020,867 B2
(45) Date of Patent: Apr. 28, 2015

(54) CORTICAL SIMULATOR FOR OBJECT-ORIENTED SIMULATION OF A NEURAL NETWORK

(71) Applicant: International Business Machines Corporation, Armonk, NY (US)

(72) Inventors: Steven K. Esser, San Jose, CA (US); Dharmendra S. Modha, San Jose, CA (US); Theodore M. Wong, Mountain Viw, CA (US)

(73) Assignee: International Business Machines Corporation, Armonk, NY (US)

(*) Notice: Subject to any disclaimer, the term of this patent is extended or adjusted under 35 U.S.C. 154(b) by 269 days.

(21) Appl. No.: 13/670,395

(22) Filed: Nov. 6, 2012

(65) Prior Publication Data
US 2014/0214739 A1    Jul. 31, 2014

(51) Int. Cl.
*G06N 3/02* (2006.01)
*G06F 7/60* (2006.01)
*G06N 3/10* (2006.01)

(52) U.S. Cl.
CPC ........................................ *G06N 3/10* (2013.01)

(58) Field of Classification Search
USPC ............................................. 706/15; 703/2, 6
See application file for complete search history.

(56) References Cited

U.S. PATENT DOCUMENTS

| 7,844,424 | B2 | 11/2010 | Comair |
| 8,126,828 | B2 | 2/2012 | Snook et al. |
| 2009/0157141 | A1 | 6/2009 | Chiao et al. |
| 2010/0312736 | A1 | 12/2010 | Kello |
| 2013/0073498 | A1* | 3/2013 | Izhikevich et al. ............. 706/27 |

FOREIGN PATENT DOCUMENTS

WO    9323814 A1    11/1993

OTHER PUBLICATIONS

Nageswaran, J.M. et al., "Towards Reverse Engineering the Brain: Modeling Abstractions and Simulation Frameworks", Proceedings of the 2010 18th IEEE/IFIP VLSI System on Chip Conference (VLSI-SoC), 2010, pp. 1-6, IEEE, USA.
Anonymous, "Neural Networks Custom Teach Environment", Research Disclosure 317079A, Sep. 1990, 1 page, No. 317, Kenneth Mason Pubiications Ltd., England.
Ananthanarayanan, R. et al., "The Cat is Out of the Bag: Cortical Simulations with 10^9 Neurons, 10^13 Synapses", Proceedings of the Conference on High Performance Computing Networking, Storage and Analysis (SC '09), 2009, pp. 1-12, ACM, USA.

* cited by examiner

*Primary Examiner* — Alan Chen
(74) *Attorney, Agent, or Firm* — Sherman IP LLP; Kenneth L. Sherman; Hemavathy Perumal (57) ABSTRACT

Embodiments of the invention relate to a function-level simulator for modeling a neurosynaptic chip. One embodiment comprises simulating a neural network using an object-oriented framework including a plurality of object-oriented classes. Each class corresponds to a component of a neural network. Running a simulation model of the neural network includes instantiating multiple simulation objects from the classes. Each simulation object is an instance of one of the classes.

25 Claims, 9 Drawing Sheets

CORTICAL SIMULATOR FOR OBJECT-ORIENTED SIMULATION OF A NEURAL NETWORK

This invention was made with Government support under HR0011-09-C-0002 awarded by Defense Advanced Research Projects Agency (DARPA). The Government has certain rights in this invention.

BACKGROUND

Embodiments of the invention relate to neuromorphic and synaptronic computation, and in particular, a function-level simulator for modeling a neurosynaptic chip.

Neuromorphic and synaptronic computation, also referred to as artificial neural networks, are computational systems that permit electronic systems to essentially function in a manner analogous to that of biological brains. Neuromorphic and synaptronic computation do not generally utilize the traditional digital model of manipulating 0s and 1s. Instead, neuromorphic and synaptronic computation create connections between processing elements that are roughly functionally equivalent to neurons of a biological brain. Neuromorphic and synaptronic computation may comprise various electronic circuits that are modeled on biological neurons.

In biological systems, the point of contact between an axon of a neural module and a dendrite on another neuron is called a synapse, and with respect to the synapse, the two neurons are respectively called pre-synaptic and post-synaptic. The essence of our individual experiences is stored in conductance of the synapses. The synaptic conductance changes with time as a function of the relative spike times of pre-synaptic and post-synaptic neurons, as per spike-timing dependent plasticity (STDP). The STDP rule increases the conductance of a synapse if its post-synaptic neuron fires after its pre-synaptic neuron fires, and decreases the conductance of a synapse if the order of the two firings is reversed.

BRIEF SUMMARY

Embodiments of the invention relate to a function-level simulator for modeling a neurosynaptic chip. One embodiment comprises simulating a neural network using an object-oriented framework including a plurality of object-oriented classes. Each class corresponds to a component of a neural network. Running a simulation model of the neural network includes instantiating multiple simulation objects from the classes. Each simulation object is an instance of one of the classes.

Another embodiment comprises a simulation model for simulating a neural network. The simulation model comprises multiple simulation objects, wherein each simulation object is an instance of an object-oriented class corresponding to a component of a neural network. Each simulation object comprises at least one attribute and at least one method. Each attribute models a characteristic of a corresponding component of the neural network. Each method acts upon one or more attributes of said simulation object.

These and other features, aspects, and advantages of the present invention will become understood with reference to the following description, appended claims, and accompanying figures.

DETAILED DESCRIPTION

Embodiments of the invention relate to a function-level simulator for modeling a neurosynaptic chip. One embodiment comprises simulating a neural network using an object-oriented framework including a plurality of object-oriented classes. Each class corresponds to a component of a neural network. Running a simulation model of the neural network includes instantiating multiple simulation objects from the classes. Each simulation object is an instance of one of the classes.

Another embodiment comprises a simulation model for simulating a neural network. The simulation model comprises multiple simulation objects, wherein each simulation object is an instance of an object-oriented class corresponding to a component of a neural network. Each simulation object comprises at least one attribute and at least one method. Each attribute models a characteristic of a corresponding component of the neural network. Each method acts upon one or more attributes of said simulation object.

The simulation model further comprises at least one core simulation object. Each core simulation object contains at least one neuron simulation object. The simulation model further comprises a network simulation object, wherein the network simulation object facilitates the exchange of spike objects between the core simulation objects.

The simulation model further comprises a driver simulation object, wherein the driver simulation object generates virtual clock ticks that are distributed to each core simulation object.

Each core simulation object receives incoming spike objects from the network simulation object. Each core simulation object delivers a spike object to a neuron object of said core simulation object when a corresponding delivery delay of the spike object has expired.

Each neuron object integrates each spike object received. Each neuron object generates an outgoing spike object when a spike threshold of said neuron object is exceeded. Each outgoing spike object is delivered to a corresponding target core simulation object.

The simulation model is preloaded with at least one configuration file, wherein said at least one configuration file includes parameters for the simulation model and sensor inputs for at least one core simulation object.

Each core simulation object further comprises at least one axon simulation object and a crossbar object including multiple synaptic weights. Each axon simulation object has a corresponding queue for maintaining incoming spike objects. Each synaptic weight represents a synaptic connection between an axon simulation object and a neuron simulation object.

Each core simulation object executes a first simulation loop, a second simulation loop, and a third simulation loop in sequence during each virtual clock tick. During the first simulation loop, an incoming spike object at the head of each axon simulation object of said core simulation object is delivered to a neuron object of said core simulation object when a delivery delay of said spike object has expired. During the second simulation loop, each neuron simulation object of said core simulation object integrates each spike object received, and generates an outgoing spike object when a spike threshold of said neuron object is exceeded. During the third simulation loop, each outgoing spike object generated by each neuron simulation object of said core simulation object is delivered to a target axon simulation object as an incoming spike object.

The term electronic neuron as used herein represents an framework configured to simulate a biological neuron. An electronic neuron creates connections between processing elements that are roughly functionally equivalent to neurons of a biological brain. As such, a neuromorphic and synaptronic computation comprising electronic neurons, according to embodiments of the invention, may include various electronic circuits that are modeled on biological neurons. Further, a neuromorphic and synaptronic computation comprising electronic neurons, according to embodiments of the invention, may include various processing elements (including computer simulations) that are modeled on biological neurons. Although certain illustrative embodiments of the invention are described herein using electronic neurons comprising electronic circuits, the present invention is not limited to electronic circuits. A neuromorphic and synaptronic computation, according to embodiments of the invention, can be implemented as a neuromorphic and synaptronic framework comprising circuitry, and additionally as a computer simulation. Indeed, embodiments of the invention can take the form of an entirely hardware embodiment, an entirely software embodiment or an embodiment containing both hardware and software elements.

Cortical simulation is an essential component in computational neuroscience. A cortical or neural network simulator may be implemented using a computer system including multiple processors. Embodiments of an object-oriented framework for a cortical simulator are provided. Embodiments of the framework disclosed herein can be used to implement large-scale cortical simulators, such as simulators modeling a mammalian cortex.

Figure 1:
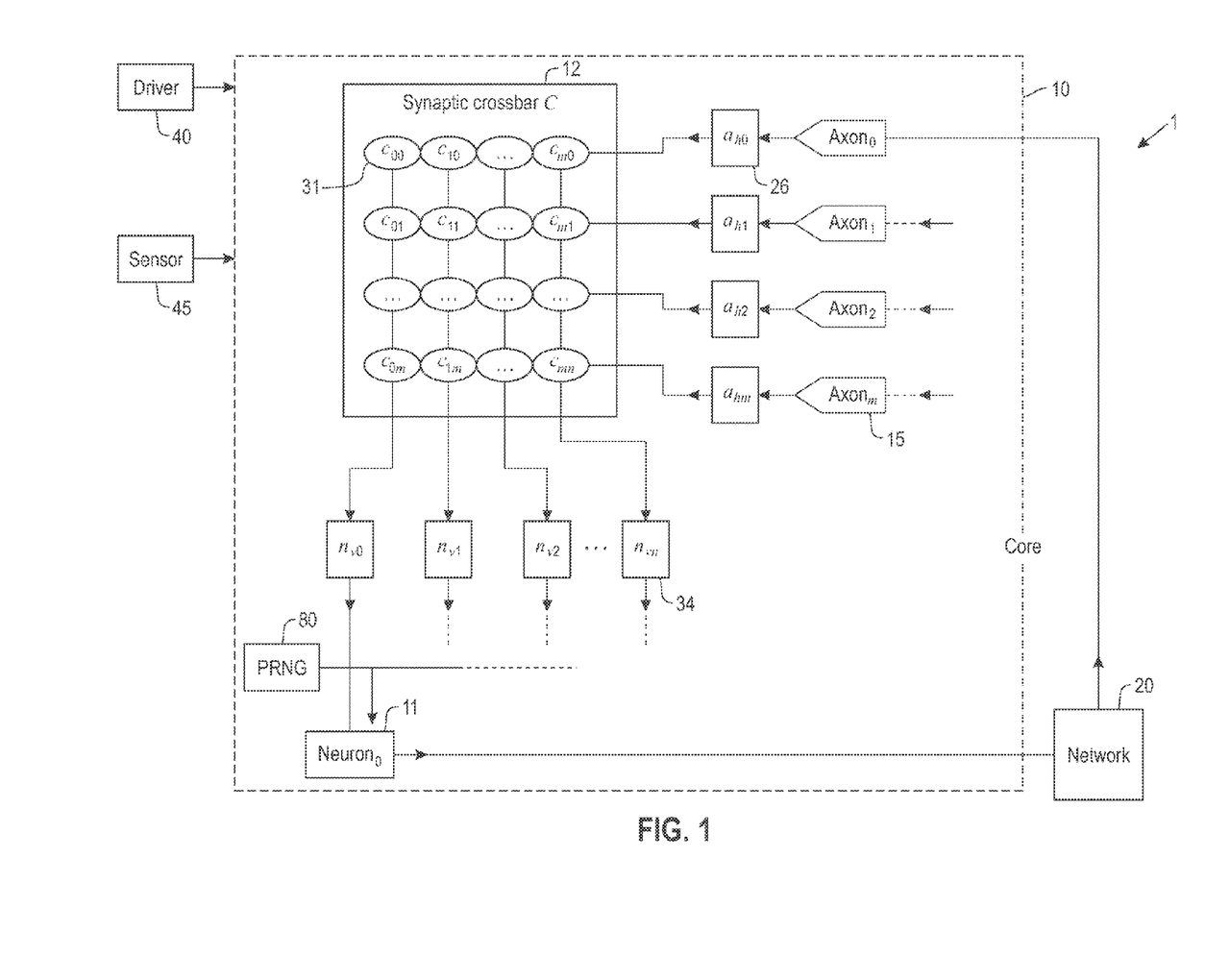
FIG. 1 illustrates a neural network, in accordance with an embodiment of the invention.

FIG. 1 illustrates a neural network 1, in accordance with an embodiment of the invention. The neural network 1 comprises multiple neurosynaptic (i.e., neural) core circuits 10. FIG. 1 illustrates one core circuit 10 of the neural network 1. The core circuit 10 comprises multiple incoming axons 15, such as axons $Axon_0$, $Axon_1$, ..., and $Axon_m$. The core circuit 10 further comprises multiple neurons 11, such as neuron $Neuron_0$. Each neuron 11 and each axon 15 has configurable operational parameters. The core circuit 10 further comprises a two-dimensional synaptic crossbar 12 including multiple synapses 31, such as synapses $c_{00}$, $c_{01}$, ..., and $c_{mn}$.

The core circuit 10 further comprises multiple axon paths 26, such as axon paths $a_{h0}$, $a_{h1}$, ..., and $a_{hm}$. Each axon 15 is connected to an axon path 26. The core circuit 10 further comprises multiple dendrite paths 34, such as dendrite paths $n_{v0}$, $n_{v1}$, ..., and $n_{vn}$. Each neuron 11 is connected to a dendrite path 34.

Each synapse 31 communicates neuronal spike events between an axon 15 and a neuron 11. Specifically, each synapse 31 is located at cross-point junction between an axon path 26 and a dendrite path 34, such that a connection between the axon path 26 and the dendrite path 34 is made through said synapse 31. Each axon 15 sends spike events to a connected axon path 26. Each neuron 11 receives spike events from a connected dendrite path 34.

Each synapse 31 has a synaptic weight. In one embodiment, the synapses 31 are binary memory devices. Each synapse 31 can have a weight "0" indicating that said synapse 31 is non-conducting, or a weight "1" indicating that said synapse 31 is conducting. A learning rule such as spike-timing dependent plasticity (STDP) may be applied to update the synaptic weights of the synapses 31.

Each neuron 11 generates a spike event when a membrane potential of said neuron 11 exceeds a deterministic or stochastic threshold potential. The core circuit 10 further comprises a pseudo-random number generator (PRNG) 80. In one embodiment, each neuron 11 draws a random number from the PRNG 80 to add stochastic noise when integrating spike events.

The neural network 1 further comprises a driver unit 40 that generates and distributes clock steps/ticks to each core circuit 10 of the neural network 1.

The neural network 1 further comprises an interconnect network (i.e., interconnect fabric) 20 that communicates spike events between the core circuits 10 of the neural network. Each outgoing spike event generated by each neuron 11 is sent to the interconnect network 20. An axon 15 of a core circuit 10 receives an incoming spike event from the interconnect network 20, wherein the spike event received was generated by a neuron 11 of the same core circuit 10 or a different core circuit 10. Each axon 15 has a buffer maintaining incoming spike events received from the interconnect network 20.

The neural network further comprises at least one sensor unit 45. Each sensor unit 45 represents an environment sensor. Each sensor unit 45 provides sensor inputs. The sensor inputs are propagated to the target axons 15 as spike events.

The neural network 1 may be instantiated as a hardware neurosynaptic chip. The present invention provides an object-oriented framework that models the behavior of a neural network.

Figure 2:
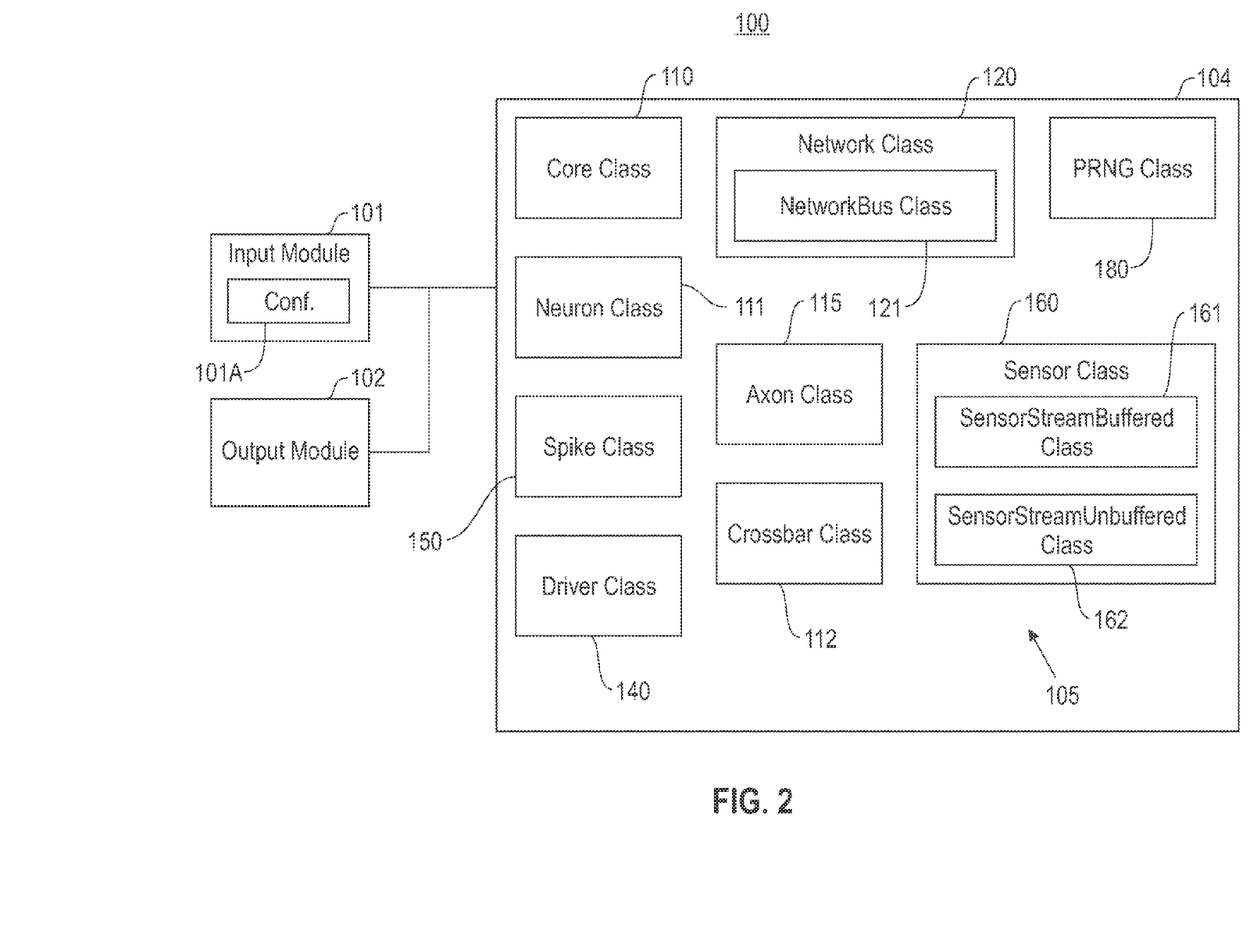
FIG. 2 is a high-level block diagram illustrating an object-oriented framework for use in simulating a neural network.

FIG. 2 is a high-level block diagram illustrating an object-oriented framework 100 for use in simulating a neural network, in accordance with an embodiment of the invention. The framework 100 comprises a collection 104 of object-oriented programming classes 105. The collection 104 includes the following base classes (i.e., superclasses): a core class 110, a network class 120, a neuron class 111, an axon class 115, a crossbar class 112, a spike class 150, a driver class 140, a PRNG class 180, and a sensor class 160.

The network class 120 and the sensor class 160 are abstract base classes. The collection 104 further includes the following subclasses: a networkBus class 121 that is a subclass of the network class 120, a sensorStreamBuffered class 161 that is a subclass of the sensor class 160, and a sensorStreamUnbuffered class 162 that is a subclass of the sensor class 160.

Figure 4:
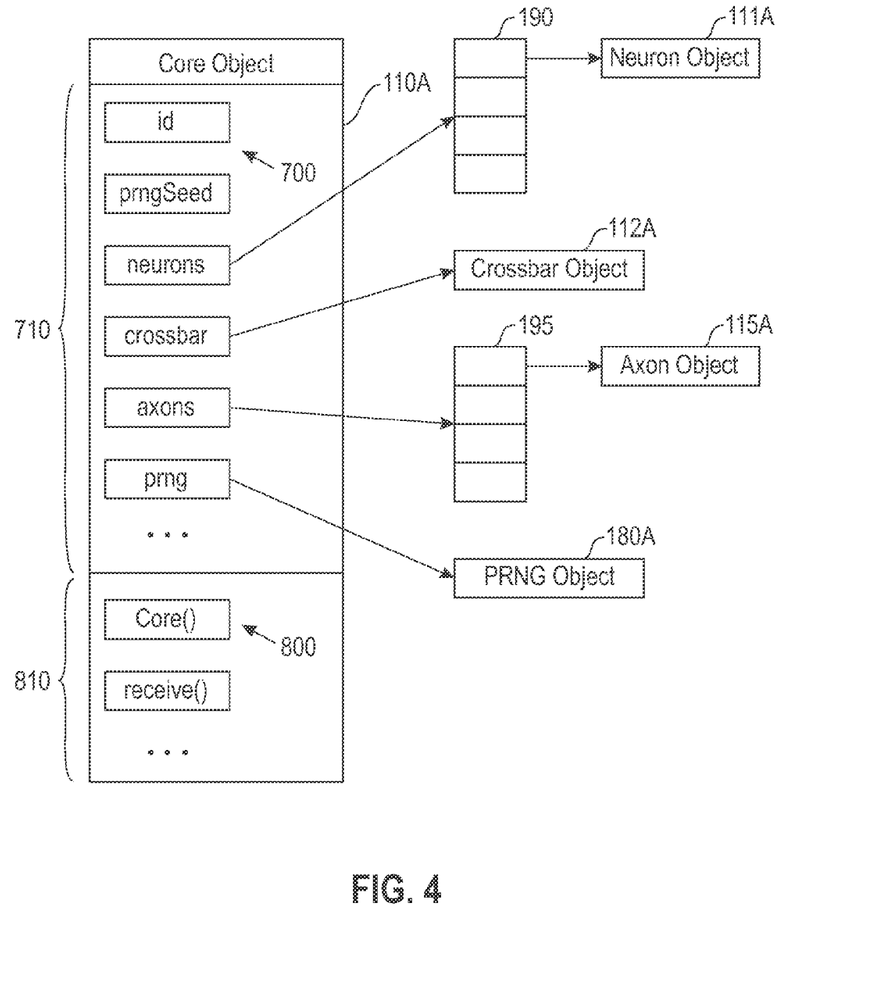
FIG. 4 illustrates an example core object that simulates a core circuit, in accordance with an embodiment of the invention.

As described in detail later herein, each class 105 models the behavior of a hardware component/element of a neural network. Each class 105 defines at least one attribute (i.e., data member) 700 (FIG. 4). Each class 105 further defines at least one method (i.e., member function) 800 (FIG. 4) that acts upon one or more attributes 700 of said class 105. Each method 800 of each class 105 can be invoked on each instance of said class 105.

The framework 100 further comprises an input module 101 and an output module 102. The input module 101 is configured to receive at least one configuration file 101A specifying parameters relating to a simulation run and sensor inputs from environmental sensors. For example, the configuration files may specify how many clock ticks that a simulation run should last. An instance of the sensorStreamBuffered class 161 reads all sensor inputs provided before a simulation run. An instance of the sensorStreamUnbuffered class 162 reads sensor inputs on demand during the simulation run.

The output module 102 is configured to output statistical information relating to a simulation run. The output module 102 may also be configured to output spikes that are stored in a file or transmitted over a network connection. In one example implementation, the spikes are transmitted to an actuator connected to the simulator.

Figure 3:
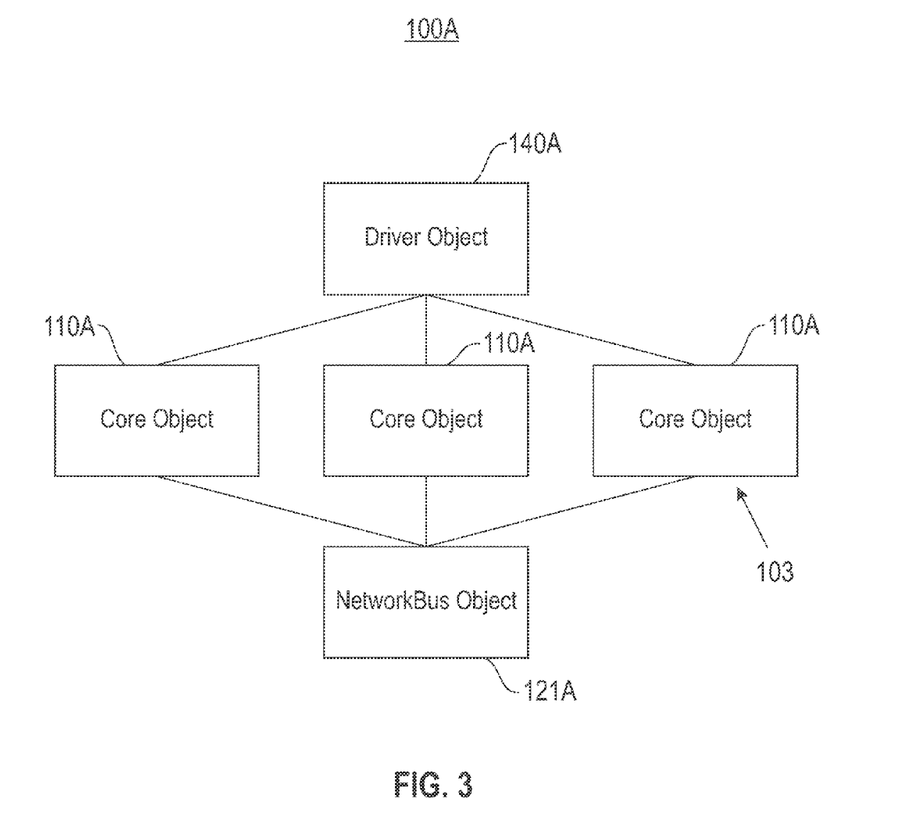
FIG. 3 is a block diagram illustrating a simulation model that simulates a neural network, in accordance with an embodiment of the invention.

FIG. 3 is a block diagram illustrating a simulation model 100A that simulates a neural network, in accordance with an embodiment of the invention. A simulation model 100A is a simulation run (i.e., running instance) of the framework. The simulation model 100A runs for a predetermined duration/number of clock ticks as specified in configuration files 101A that the simulation model 100A is preloaded with. As shown in FIG. 3, the simulation model 100A contains multiple simulations objects 103, wherein each simulation object is an instance of a class 105 of the framework 100. Specifically, the simulation model 100A comprises multiple core objects 110A, wherein each core object 110A is an instance of the core class 110. Each core object 110A models the behavior of a core circuit 10.

The simulation model 100A further comprises a networkBus object 121A, wherein the networkBus object 121A is an instance of the networkBus class 121. The networkBus object 121A models the behavior of an interconnect network 20. The networkBus object 121A facilitates the exchange of spike objects 150A (FIG. 5A) between the core objects 110A of the simulation model 100A. In one embodiment, the networkBus object 121A further facilitates the transmission of sensor inputs from one or more sensor unit/object 45 to the core objects 110A. Each spike object 150A is an instance of the spike class 150. Each spike object 150A models the behavior of a spike event.

Also shown in FIG. 3, the simulation model 100A further comprises a driver object 140A, wherein the driver object 140A is an instance of the driver class 140. The driver object 140A generates virtual clock steps/ticks that are distributed to each core object 110A of the simulation model 100A.

Each core object 110A may receive external spike objects 150A. In one embodiment, the simulation model 100A may further comprise an instance of a sensorStreamBuffered class 161 or a sensorStreamUnbuffered class 162 for receiving sensor inputs from environmental sensors. The sensor inputs are propagated as spike objects 150A.

FIG. 4 illustrates an example core object 110A that simulates a core circuit 10, in accordance with an embodiment of the invention. As stated above, the simulation model 100A includes multiple core objects 110A. The core class 110 defines a set 710 of attributes 700 and a set 810 of methods 800. Each core object 110A includes the set 710 of attributes 700 and the set 810 of methods 800.

As shown in FIG. 4, in one embodiment, the set 710 of each core object 110A includes an id attribute, a prngSeed attribute, a neurons attribute, a crossbar attribute, an axons attribute, and a prng attribute.

Each core object 110A of the simulation model 100A has a unique corresponding identifier. The id attribute of each core object 110A provides an identifier corresponding to said core object 110A.

Each core object 110A includes at least one neuron object 111A. Each neuron object 111A is an instance of the neuron class 111. Each neuron object 111A models the behavior of a neuron 11. The neurons attribute of each core object 110A references the neuron objects 111A of said core object 110A. In one example implementation, the neurons attribute is a pointer that references an array 190 of neuron objects 111A.

Each core object 110A further includes at least one axon object 115A. Each axon object 115A is an instance of the axon class 115. Each axon object 115A models the behavior of an incoming axon 15. The axons attribute of each core object 110A references the axon objects 115A of said core object 110A. In one example implementation, the axons attribute is a pointer that references an array 195 of axon objects 115A.

Each core object 110A further includes a crossbar object 112A. The crossbar object 112A is an instance of the crossbar class 112. The crossbar object 112A models the behavior of a crossbar 12. The crossbar attribute of each core object 110A references the crossbar object 112A of said core object 110A. In one example implementation, the crossbar attribute is a pointer that references a crossbar object 112A.

Each core object 110A further includes a PRNG object 180A. The PRNG object 180A is an instance of the PRNG class 180. The PRNG object 180A models the behavior of a PRNG 80. The prng attribute of each core object 110A references the PRNG object 180A of said core object 110A. In one example implementation, the prng attribute is a pointer that references a PRNG object 180A.

The prngSeed attribute of each core object 110A identifies a seed for the PRNG object 180A of said core object 110A. In one example implementation, the prngSeed attribute of each core object 110A is set to an integer value in the range of 1 to 4294967295.

As shown in FIG. 4, in one embodiment, the set 810 of each core object 110A includes a core( ) method and a receive( ) method. The core( ) method is a constructor method that generates a new core object 110A when called.

When the receive( ) method of a core object 110A is called, the core object 110A receives incoming spike objects 150A targeting one or more axon objects 115A of the core object 110A. Each core object 110A of the simulation model 100A receives incoming spike objects 150A from the networkBus object 121A of the simulation model 100A.

The set 710 may include additional attributes 700 not shown in FIG. 4. The set 810 may include additional methods 800 not shown in FIG. 4.

Simulated execution cycles for each core object 110A are driven by the virtual clock ticks generated by the driver object 140A.

Figure 5A:
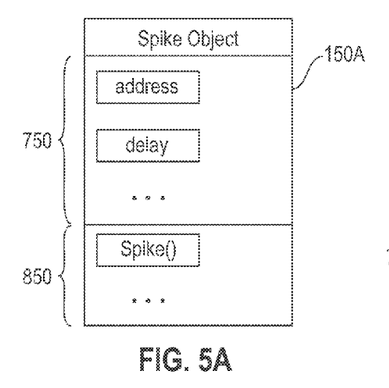
FIG. 5A illustrates an example spike object that simulates a spike event, in accordance with an embodiment of the invention.

FIG. 5A illustrates an example spike object 150A that simulates a spike event, in accordance with an embodiment of the invention. An axon object 115A receives an incoming spike object 150A from the networkBus object 121A of the simulation model 100A. A neuron object 111A generates and sends an outgoing spike object 150A to the networkBus object 121A when the neuron object 111A spikes.

The spike class 150 defines a set 750 of attributes 700 and a set 850 of methods 800. Each spike object 150A includes the set 750 of attributes 700 and the set 850 of methods 800.

As shown in FIG. 5A, in one embodiment, the set 750 of each spike object 150A includes an address attribute and a delay attribute.

An outgoing spike object 150A generated by a neuron object 111A targets an axon object ("target axon object") 115A of a core object ("target core object") 110A of the simulation model 100A. The address attribute of each spike object 150A provides the target axon object 115A and the target core object 110A for said spike object 150A.

A spike object 150A is processed by a corresponding target core object 110A only after a predetermined duration of time ("delivery delay") has elapsed. A target axon object 115A maintains an incoming spike object 150A until the delivery delay for the spike object 150A has elapsed. The delivery delay must be at least one clock step/tick. The delay attribute of each spike object 150A provides the delivery delay for said spike object 150A.

As shown in FIG. 5A, in one embodiment, the set 850 of each spike object 150A includes a spike( ) method. The spike( ) method is a constructor method that generates a new spike object 150A when called.

Figure 5B:
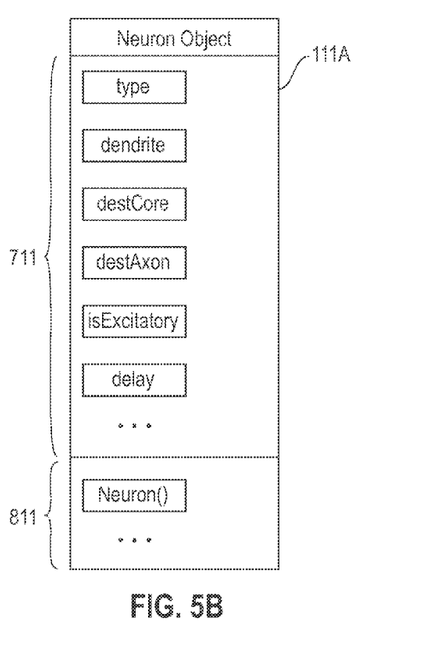
FIG. 5B illustrates an example neuron object that simulates a neuron, in accordance with an embodiment of the invention.

FIG. 5B illustrates an example neuron object 111A that simulates a neuron 11, in accordance with an embodiment of the invention. As stated above, each core object 110A includes at least one neuron object 111A. The neuron class 111 defines a set 711 of attributes 700 and a set 811 of methods 800. Each neuron object 111A of each core object 110A includes the set 711 of attributes 700 and the set 811 of methods 800.

As shown in FIG. 5B, in one embodiment, the set 711 of each neuron object 111A includes a type attribute, a dendrite attribute, a destCore attribute, a destAxon attribute, an is Excitatory attribute, and a delay attribute.

The framework 100 supports the simulation of different types of neurons 11. As described in detail later herein, the framework 100 further includes a neuron type library 450 (FIG. 5C) that maintains the neuronal parameters for different types of neurons 11. The type attribute of each neuron object 111A identifies the type of neuron 11 that said neuron object 111A simulates. If the type attribute of a neuron object 111A is set to null, the neuron object 111A is not used. The destCore, destAxon, and delay attributes of a neuron object 111A need not be set if the type attribute of the neuron object 111A is set to null.

Each neuron object 111A of each core object 110A receives spike objects 150A from a dendrite path of a crossbar object 112A of said core object 110A. The dendrite attribute of each neuron object 111A identifies a dendrite path that said neuron object 111A receives spike objects 150A from. For example, if each core object 110A simulates a core circuit 10 with a 256×256 crossbar 12, the dendrite attribute of each neuron object 111A is set to an integer value in the range of 0 to 255.

Each spike object 150A generated by each neuron object 111A targets an axon object ("target axon object") 115A of a core object ("target core object") 110A of the simulation model 100A. For each neuron object 111A of each core object 110A, the target axon object 115A for said neuron object 111A may be an axon object 115A of said core object 110A or a different core object 110A.

The destCore attribute of each neuron object 111A identifies a target core object 110A that each spike object 150A generated by said neuron object 111A is routed to. If the destCore attribute of a neuron object 111A is set to a value less than zero, spike objects 150A generated by the neuron object 111A are dropped (i.e., not routed to any core object 110A of the simulation model 100A).

The destAxon attribute of each neuron object 111A identifies a target axon object 115A that each spike object 150A generated by said neuron object 111A is routed to. If the destAxon attribute of a neuron object 111A is set to a value less than zero, spike objects 150A generated by the neuron object 111A are dropped.

For each spike object 150A generated by each neuron object 111A, the target core object 110A for said neuron object 111A will process said spike object 150A only after a predetermined duration of time ("delivery delay") has elapsed. The delivery delay must be at least one clock step/tick. The delay attribute of each neuron object 111A provides the delivery delay for each spike object 150A generated by said neuron object 111A.

As shown in FIG. 5B, in one embodiment, the set 811 of each neuron object 111A includes a neuron( ) method. The neuron( ) method is a constructor method that generates a new neuron object 111A when called. In one embodiment, a core object 110A calls the neuron( ) method to create a neuron object 111A.

The set 711 may include additional attributes 700 not shown in FIG. 5B. The set 811 may include additional methods 800 not shown in FIG. 5B.

Figure 5C:
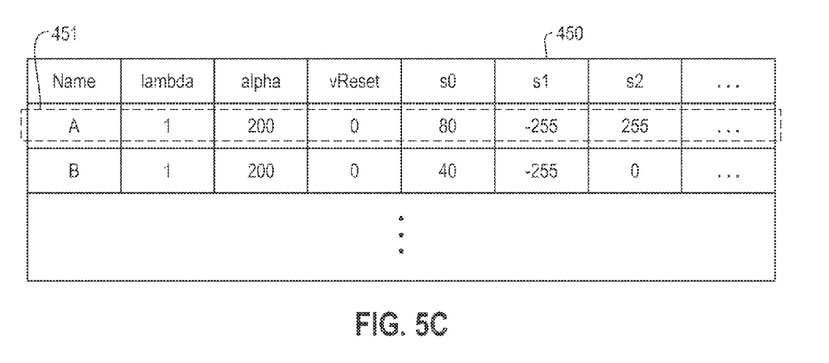
FIG. 5C illustrates a neuron type library of the framework, in accordance with an embodiment of the invention.

FIG. 5C illustrates a neuron type library 450 of the framework 100, in accordance with an embodiment of the invention. The framework 100 supports the simulation of different types of neurons 11. The framework 100 further includes a configurable neuron type library 450 that maintains neuronal parameters for different types of neurons 11. A configuration file 101A (FIG. 2) preloaded into the simulation model 100A may specify neuronal parameters for different types of neurons 11.

In one embodiment, the neuron type library 450 is a memory array including multiple entries 451. Each entry 451 corresponds to a type of neuron 11. For example, as shown in FIG. 5C, a first entry 451 corresponds to a neuron type "A", and a second entry 451 corresponds to a neuron type "B".

Each entry 451 maintains one or more neuronal parameters for a corresponding type of neuron 11. In one embodiment, each entry 451 includes the following neuronal parameters: a spike threshold parameter ($\alpha$ or alpha), a leak rate parameter ($\lambda$ or lambda), a membrane potential reset parameter ($V_{reset}$ or vReset), and four synaptic excitation strengths ($s_0$, $s_1$, $s_2$, and $s_3$). Inhibition in a synaptic strength is indicated by a negative value instead of a positive value. Each entry 451 may include additional neuronal parameters not shown in FIG. 5C.

Each neuron object 111A obtains neuronal parameters corresponding to the type attribute of said neuron object 111A from the neuron type library 450. For example, a neuron object 111A with a type attribute set to "A" will obtain neuronal parameters from the first entry 451 of the neuron type library 450.

Figure 5D:
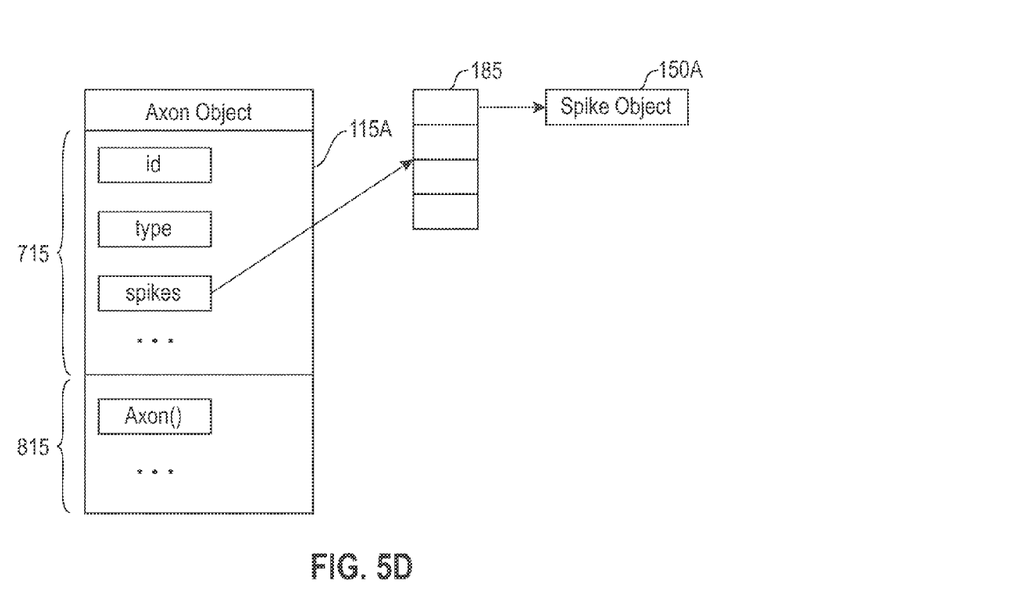
FIG. 5D illustrates an example axon object that simulates an incoming axon, in accordance with an embodiment of the invention.

FIG. 5D illustrates an example axon object 115A that simulates an incoming axon 15, in accordance with an embodiment of the invention. As stated above, each core object 110A includes at least one axon object 115A. The axon class 115 defines a set 715 of attributes 700 and a set 815 of methods 800. Each axon object 115A includes the set 715 of attributes 700 and the set 815 of methods 800.

As shown in FIG. 5D, in one embodiment, the set 715 of each axon object 115A includes an id attribute, a type attribute, and a spikes attribute.

The id attribute of each axon object 115A provides an identifier corresponding to said axon object 115A. In one embodiment, the type attribute of each axon object 115A provides an axon type for said axon object 115A (e.g., $s_0$, $s_1$, $s_2$, and $s_3$).

The spikes attribute of each axon object 115A references the incoming spike objects 150A that said axon object 115A receives from the networkBus object 121A of the simulation model 100A. In one example implementation, the spikes attribute is a pointer that references a queue 185 of incoming spike objects 150A. The incoming spike objects 150A are ordered based on the delivery delay. A spike object 150A with the shortest remaining delivery delay is at the head of the queue 185.

As shown in FIG. 5D, in one embodiment, the set 815 of each axon object 115A includes an axon( ) method. The axon( ) method is a constructor method that generates a new axon object 115A when called. In one embodiment, a core object 110A calls the axon( ) method to create an axon object 115A.

The set 715 may include additional attributes 700 not shown in FIG. 5D. The set 815 may include additional methods 800 not shown in FIG. 5D.

Figure 5E:
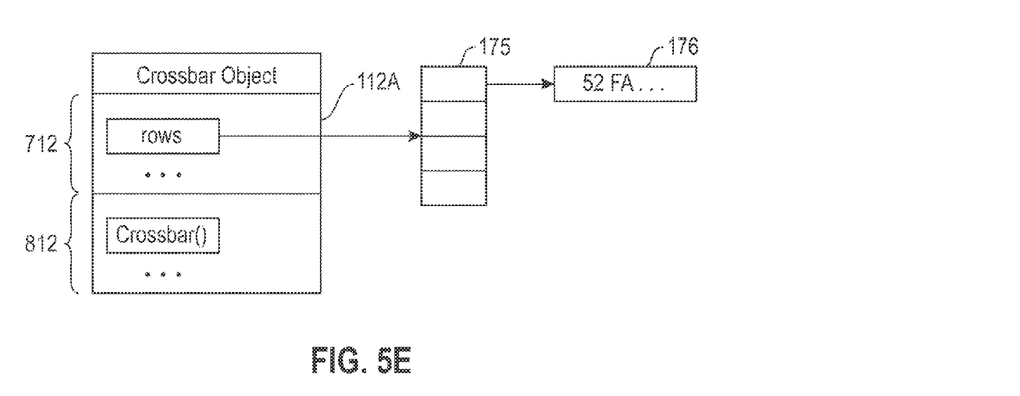
FIG. 5E illustrates an example crossbar object that simulates a synaptic crossbar, in accordance with an embodiment of the invention.

FIG. 5E illustrates an example crossbar object 112A that simulates a synaptic crossbar 12, in accordance with an embodiment of the invention. As stated above, each core object 110A includes a crossbar object 112A. Each crossbar object 112A provides a two-dimensional matrix of synaptic weights, wherein each row of the matrix represents an axon path, and each column of the matrix represents a dendrite path. Each synaptic weight represents a synaptic connection (e.g., a synapse) between an axon path and a dendrite path. In one embodiment, each synaptic weight is either a 0-bit indicating a non-conducting synaptic connection or a 1-bit indicating a conducting synaptic connection.

The crossbar class 112 defines a set 712 of attributes 700 and a set 812 of methods 800. Each crossbar object 112A includes the set 712 of attributes 700 and the set 812 of methods 800. To implement a two-dimensional matrix of synaptic weights, in one embodiment, the set 712 of each crossbar object 112A includes a rows attribute. In one embodiment, the rows attribute may be a pointer that references an array 175. In one embodiment, the array 175 is an m×n array having m 1-dimensional vectors 176, wherein each vector 176 has n bits. In another embodiment, the array 175 is an n×n array having n 1-dimensional vectors 176, wherein each vector 176 has n bits. Each vector 176 maintains synaptic weights for synaptic connections. For example, if a vector 176 represents n bits, each bit of the vector 176 represents the synaptic weight of a synapse 31, and the n bits are maintained as a hexadecimal string.

As shown in FIG. 5E, in one embodiment, the set 812 of each crossbar object 112A includes a crossbar( ) method. The crossbar( ) method is a constructor method that generates a new crossbar object 112A when called. In one embodiment, a core object 110A calls the crossbar( ) method to create a crossbar object 112A.

The set 712 may include additional attributes 700 not shown in FIG. 5E. The set 812 may include additional methods 800 not shown in FIG. 5E.

In one embodiment, each core object 110A executes three simulation loops in sequence during a clock tick. In the first simulation loop, for each axon object 115A of a core object 110A, a determination is made as to whether the delivery delay of the spike object 150A at the head of said axon object 115A has expired. If the delivery delay has expired, each synaptic weight representing a synaptic connection interconnecting said axon object 115A and a dendrite path of the crossbar object 112A is applied. A neuron object 111A will receive the spike object 150A from a corresponding dendrite path only if the synaptic weight representing a synaptic connection between said axon object 115A and the dendrite path indicates a conducting synaptic connection.

In the second simulation loop, each neuron object 111A integrates the spike objects 150A received. To simulate the integration of spike events, each neuron object 111A maintains the following variables: a membrane potential (V), the number of spikes received with $s_0$ strength ($n_0$), the number of spikes received with $s_1$ strength ($n_1$), the number of spikes received with $s_2$ strength ($n_2$), and the number of spikes received with $s_3$ strength ($n_3$). The membrane potential variable V is a non-negative value.

For each neuron object 111A simulating a linear-leak integrate-and-fire neuron, the membrane potential variable V of said neuron object 111A is updated using the following example formula: $V(t)=V(t-1)+s_0 n_0+s_1 n_1+s_2 n_2+s_3 n_3-\lambda$, wherein t denotes the current clock step/tick. The neuron object 111A simulates a membrane potential leak by decreasing the membrane potential variable V by the amount $\lambda$ after each clock tick.

If the membrane potential variable V exceeds the spike threshold parameter a, the neuron object 111A invokes the spike( ) constructor method of the spike class 150 to generate a spike object 150A. In one embodiment, the neuron object 111A resets the membrane potential variable V to zero if the membrane potential variable V drops below zero. In another embodiment, the neuron object 111A resets the membrane potential variable V to the membrane potential reset attribute $V_{reset}$. The simulation model 100A may support different types of neurons.

In the third simulation loop, each outgoing spike object 150A generated by each neuron object 111A is delivered to a target axon object 115A as an incoming spike object 150A.

Table 1 below provides an example configuration file 101A that the simulation model 100A may be preloaded with.

TABLE 1

```
{
    "model" : {
        "coreCount" : 256, /* Number of core objects the simulation
            model contains */
        "crossbarSize" : 246, /* Number of dendrites & axons of a
            crossbar object */
        "neuronLibrary" : { /* neuronal parameters for different neuron
            types */
            "count" : 3,
            "neuronType" : {
                "name" : "A",
                "class" : "neuronLLIF",
                "parameters" : [80, 255, 255, 1, 200, 0]
            },
            /* More neuron types */
        },
        "cores" : {
            "core" : {
                "class" : "core",
                "id" : 0, /* Identifier for a core object */
                "neurons" : {
                    "count" : 246, /* Number of neuron objects the
                        core object has */
                    "neuron" : { /* neuronal attributes for a neuron
                        object */
                        "type" : "A",
                        "sourceDendrite" : 0,
                        "targetcore" : 0,
                        "targetAxon" : 0,
                        "isExcitatory" : true,
                        "delay" : 1
                    },
```

TABLE 1-continued

```
            /* Up to crossbarSize - 1 more neuron objects */
        },
        "crossbar" : {
            "class" : "crossbarBinary",
            "synapses" : [/* Synaptic weights for crossbar
            object */
                "00 /* 245 more bytes */",
            ]
        }
    },
    /* More core objects */
    }
  }
}
```

Figure 6:
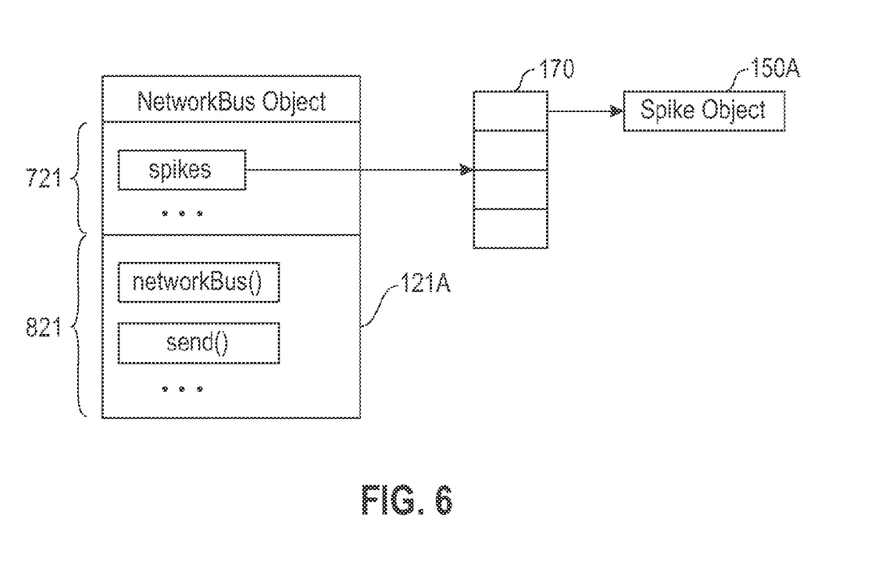
FIG. 6 illustrates an example networkBus object that simulates an interconnect network, in accordance with an embodiment of the invention.

FIG. 6 illustrates an example networkBus object 121A that simulates an interconnect network 20, in accordance with an embodiment of the invention. As stated above, the simulation model 100A includes a networkBus object 121A that facilitates the exchange of spike objects 150A between the core objects 110A. The networkBus class 121 defines a set 721 of attributes 700 and a set 821 of methods 800. Each networkBus object 121A includes the set 721 of attributes 700 and the set 821 of methods 800.

As shown in FIG. 6, in one embodiment, the set 721 of each networkBus object 121A includes a spikes attribute. The spikes attribute of each networkBus object 121A references the outgoing spike objects 150A that said networkBus object 121A receives in a clock tick from each core object 110A of the simulation model 100A. In one example implementation, the spikes attribute is a pointer that references a buffer 170 of outgoing spike objects 150A.

As shown in FIG. 6, in one embodiment, the set 821 of each networkBus object 121A includes a networkBus( ) method and a send( ) method. The networkBus( ) method is a constructor method that generates a new networkBus object 121A when called.

When the send( ) method of a networkBus object 121A is called, the networkBus object 121A sends each outgoing spike object 150A to the corresponding target core object 110A of said spike object 150A. The send( ) method is called at the end of each clock tick.

The set 721 may include additional attributes 700 not shown in FIG. 6. The set 821 may include additional methods 800 not shown in FIG. 6.

Figure 7:
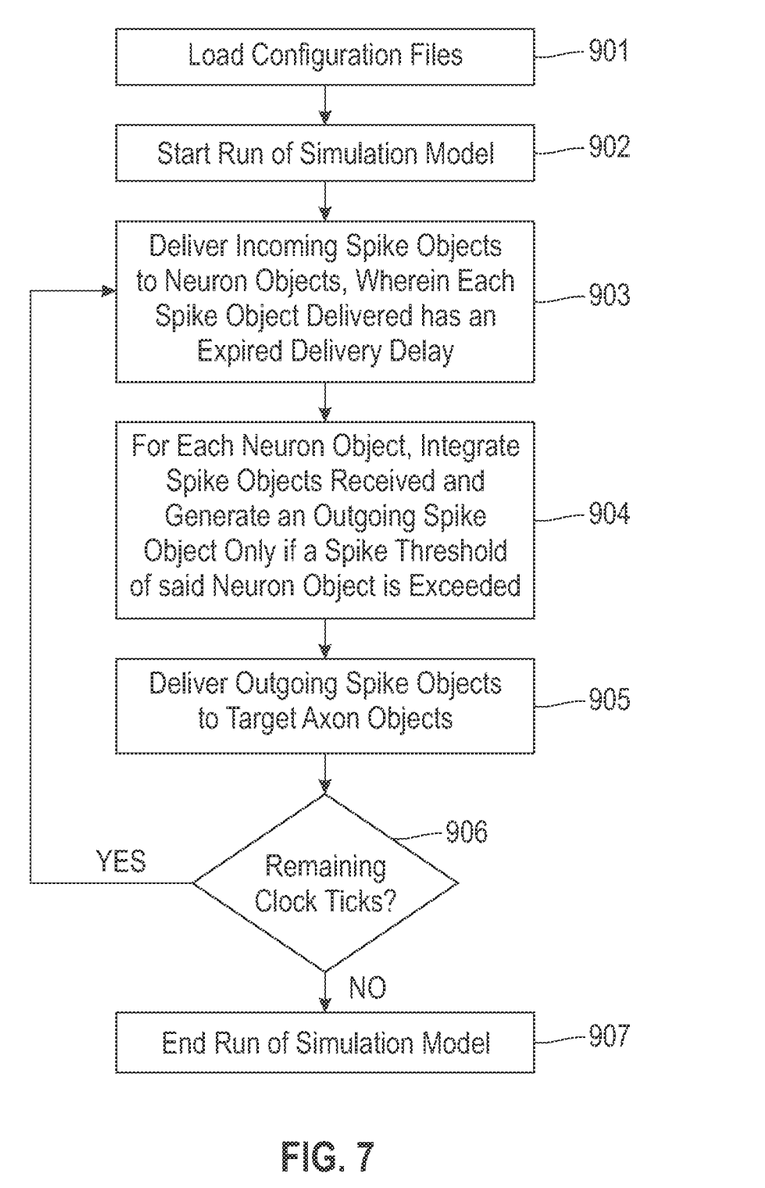
FIG. 7 illustrates a flowchart of an example process for simulating a neural network, in accordance with an embodiment of the invention.

FIG. 7 illustrates a flowchart of an example process 900 for simulating a neural network, in accordance with an embodiment of the invention. In process block 901, configuration files specifying parameters for a simulation run are loaded. In process block 902, the simulation run is started. In process block 903, each incoming spike object with an expired delivery delay is delivered to a neuron object. In process block 904, for each neuron object, spike objects received by said neuron object are integrated, and an outgoing spike object is generated only if a spike threshold of said neuron object is exceeded. In process block 905, outgoing spike objects are delivered to target axon objects. In process block 906, it is determined whether there are remaining clock ticks. If there are remaining clock ticks, return to process block 903. If there are no remaining clock ticks, proceed to process block 907 where the simulation run ends.

Figure 8:
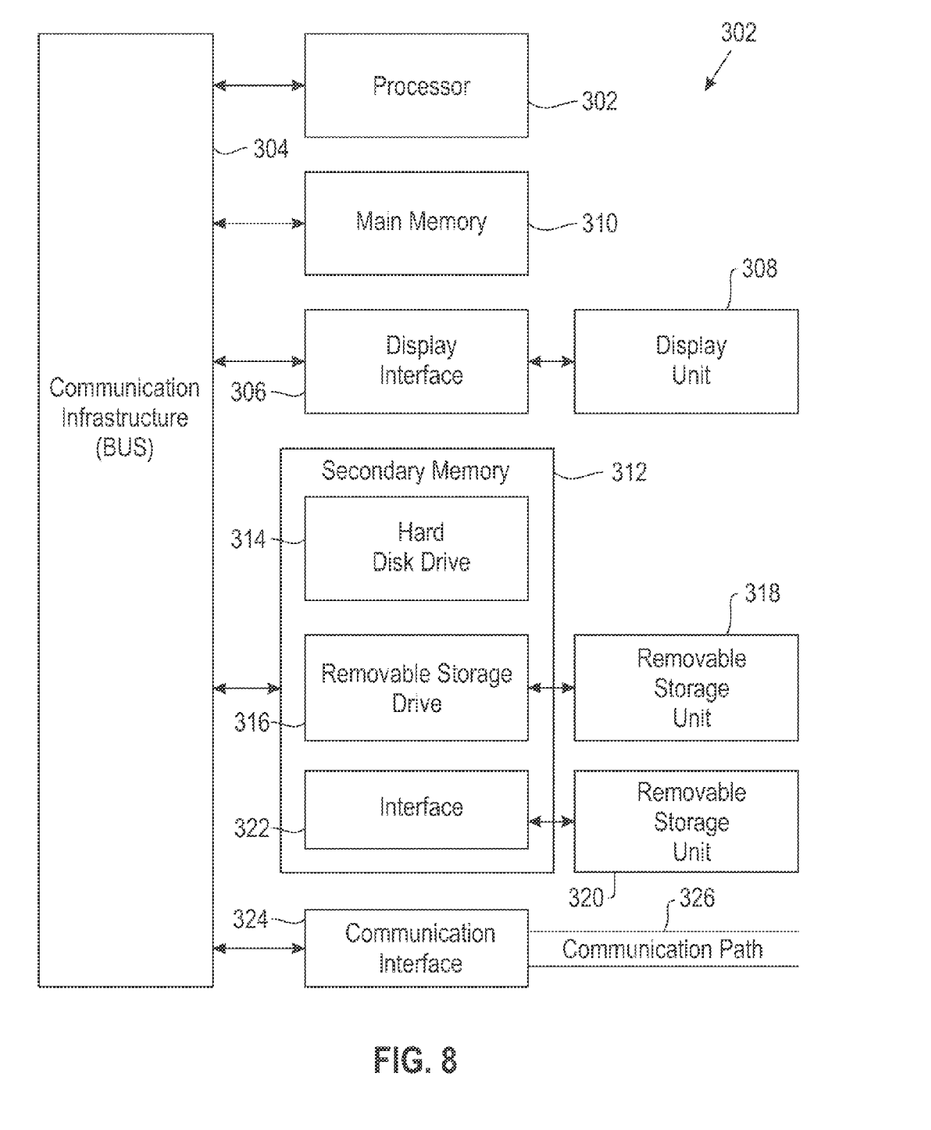
FIG. 8 is a high-level block diagram showing an information processing circuit useful for implementing one embodiment of the invention.

FIG. 8 is a high level block diagram showing an information processing system 300 useful for implementing one embodiment of the invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the communication infrastructure 304 (or from a frame buffer not shown) for display on a display unit 308. The computer system also includes a main memory 310, preferably random access memory (RAM), and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322, which allows software and data to be transferred from the removable storage unit 320 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

In this document, the terms "computer program medium," "computer usable medium," and "computer readable medium" are used to generally refer to media such as main memory 310 and secondary memory 312, removable storage drive 316, and a hard disk installed in hard disk drive 314.

Computer programs (also called computer control logic) are stored in main memory 310 and/or secondary memory 312. Computer programs may also be received via communication interface 324. Such computer programs, when run, enable the computer system to perform the features of the present invention as discussed herein. In particular, the computer programs, when run, enable the processor 302 to perform the features of the computer system. Accordingly, such computer programs represent controllers of the computer system.

From the above description, it can be seen that the present invention provides a system, computer program product, and method for implementing the embodiments of the invention. The present invention further provides a non-transitory computer-useable storage medium for hierarchical routing and two-way information flow with structural plasticity in neural networks. The non-transitory computer-useable storage medium has a computer-readable program, wherein the program upon being processed on a computer causes the computer to implement the steps of the present invention according to the embodiments described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for simulating a neural network using an object-oriented framework, comprising:
    defining a plurality of object-oriented classes, wherein each class corresponds to a component of a neural network; and
    running a simulation model of the neural network by instantiating multiple simulation objects from said classes, wherein each simulation object is an instance of one of said classes;
    wherein said multiple simulation objects comprise:
        at least one neuron simulation object corresponding to a neuron of the neural network;
        at least one axon simulation object corresponding to an axon of the neural network; and
        at least one crossbar simulation object corresponding to one or more weighted synaptic connections interconnecting the neuron to the axon.

2. The method of claim 1, further comprising:
    for each class:
        defining at least one attribute for said class, wherein each attribute models a characteristic of a corresponding component of the neural network; and
        defining at least one method for said class, wherein each method acts upon one or more attributes of said class.

3. The method of claim 2, wherein running a simulation model further comprises:
    instantiating at least one core simulation object, wherein each core simulation object comprises at least one neuron simulation object.

4. The method of claim 3, wherein running a simulation model further comprises:
    instantiating a network simulation object, wherein the network simulation object facilitates the exchange of spike objects between the core simulation objects.

5. The method of claim 4, wherein running a simulation model further comprises:
    instantiating a driver simulation object, wherein the driver simulation object generates virtual clock ticks that are distributed to each core simulation object.

6. The method of claim 5, further comprising:
    for each core simulation object, receiving incoming spike objects from the network simulation object.

7. The method of claim 6, further comprising:
    for each core simulation object, delivering a spike object to a neuron simulation object of said core simulation object when a corresponding delivery delay of the spike object has expired.

8. The method of claim 7, further comprising:
    for each neuron simulation object:
        integrating each spike object received; and
        generating an outgoing spike object when a spike threshold of said neuron simulation object is exceeded.

9. The method of claim 8, further comprising:
    delivering each outgoing spike object to a corresponding target core simulation object.

10. The method of claim 9, further comprising:
    preloading the simulation model with at least one configuration file, wherein said at least one configuration file includes parameters for the simulation model and sensor inputs for at least one core simulation object.

11. The method of claim 3, wherein each core simulation object further comprises:
    at least one axon simulation object, wherein each axon simulation object has a corresponding queue for maintaining incoming spike objects; and
    a crossbar simulation object including multiple synaptic weights, wherein each synaptic weight represents a synaptic connection between an axon simulation object and a neuron simulation object.

12. The method of claim 11, further comprising:
    for each core simulation object:
        executing a first simulation loop, a second simulation loop, and a third simulation loop in sequence during each virtual clock tick;
        wherein, during the first simulation loop, an incoming spike object at the head of each axon simulation object of said core simulation object is delivered to a neuron simulation object of said core simulation object when a delivery delay of said spike object has expired;
        wherein, during the second simulation loop, each neuron simulation object of said core simulation object integrates each spike object received, and generates an outgoing spike object when a spike threshold of said neuron simulation object is exceeded; and
        wherein, during the third simulation loop, each outgoing spike object generated by each neuron simulation object of said core simulation object is delivered to a target axon simulation object as an incoming spike object.

13. A simulation model encoded on a non-transitory computer readable storage medium for simulating a neural network, comprising:

multiple simulation objects, wherein each simulation object is an instance of an object-oriented class corresponding to a component of a neural network;
wherein each simulation object comprises:
    at least one attribute, wherein each attribute models a characteristic of a corresponding component of the neural network; and
    at least one method, wherein each method acts upon one or more attributes of said simulation object;
wherein said multiple simulation objects comprise:
    at least one neuron simulation object corresponding to a neuron of the neural network;
    at least one axon simulation object corresponding to an axon of the neural network; and
    at least one crossbar simulation object corresponding to one or more weighted synaptic connections interconnecting the neuron to the axon; and
wherein the simulation model is run on one or more processors.

14. The simulation model of claim 13, further comprising:
at least one core simulation object, wherein each core simulation object comprises at least one neuron simulation object; and
a network simulation object, wherein the network simulation object facilitates the exchange of spike objects between the core simulation objects.

15. The simulation model of claim 14, further comprising:
a driver simulation object, wherein the driver simulation object generates virtual clock ticks that are distributed to each core simulation object.

16. The simulation model of claim 15, wherein:
each core simulation object:
    receives incoming spike objects from the network simulation object; and
    delivers a spike object to a neuron simulation object of said core simulation object when a corresponding delivery delay of the spike object has expired.

17. The simulation model of claim 16, wherein:
each neuron simulation object:
    integrates each spike object received; and
    generates an outgoing spike object when a spike threshold of said neuron simulation object is exceeded, wherein said outgoing spike object targets a corresponding target core simulation object.

18. The simulation model of claim 16, wherein:
the simulation model is preloaded with at least one configuration file, wherein said at least one configuration file includes parameters for the simulation model and sensor inputs for at least one core simulation object.

19. The simulation model of claim 14, wherein each core simulation object further comprises:
at least one axon simulation object, wherein each axon simulation object has a corresponding queue for maintaining incoming spike objects; and
a crossbar simulation object including multiple synaptic weights, wherein each synaptic weight represents a synaptic connection between an axon simulation object and a neuron simulation object.

20. The simulation model of claim 19, wherein:
each core simulation object:
    executes a first simulation loop, a second simulation loop, and a third simulation in sequence during each virtual clock tick;
    wherein, during the first simulation loop, an incoming spike object at the head of each axon simulation object of said core simulation object is delivered to a neuron simulation object of said core simulation object when a delivery delay of said spike object has expired;
    wherein, during the second simulation loop, each neuron simulation object of said core simulation object integrates each spike object received, and generates an outgoing spike object when a spike threshold of said neuron simulation object is exceeded; and
    wherein, during the third simulation loop, each outgoing spike object generated by each neuron simulation object of said core simulation object is delivered to a target axon simulation object as an incoming spike object.

21. A non-transitory computer program product for a simulating a neural network, the computer program product comprising a computer-readable storage medium having program code embodied therewith, the program code being executable by a computer to:
run a simulation model of a neural network by instantiating multiple simulation objects, wherein each simulation object is an instance of an object-oriented class that corresponds to a component of a neural network;
wherein each simulation object comprises at least one attribute that models a characteristic of a corresponding component of the neural network;
wherein each simulation object further comprises at least one method that acts upon one or more attributes of said simulation object; and
wherein said multiple simulation objects comprise:
    at least one neuron simulation object corresponding to a neuron of the neural network;
    at least one axon simulation object corresponding to an axon of the neural network; and
    at least one crossbar simulation object corresponding to one or more weighted synaptic connections interconnecting the neuron to the axon.

22. The program of claim 21, further executable by the computer to:
instantiate at least one core simulation object, wherein each core simulation object comprises at least one neuron simulation object; and
instantiate a network simulation object, wherein the network simulation object facilitates the exchange of spike objects between the core simulation objects.

23. The program of claim 22, further executable by the computer to:
for each core simulation object:
    receive incoming spike objects from the network simulation object; and
    delivering a spike object to a neuron simulation object of said core simulation object when a corresponding delivery delay of the spike object has expired.

24. The program of claim 23, further executable by the computer to:
preload the simulation model with at least one configuration file, wherein said at least one configuration file includes parameters for the simulation model and sensor inputs for at least one core simulation object.

25. The program of claim 22, further executable by the computer to:
for each core simulation object:
    execute a first simulation loop, a second simulation loop, and a third simulation in sequence during each virtual clock tick;
    wherein, during the first simulation loop, an incoming spike object at the head of each axon simulation object of said core simulation object is delivered to a neuron simulation object of said core simulation object when a delivery delay of said spike object has expired;

wherein, during the second simulation loop, each neuron simulation object of said core simulation object integrates each spike object received, and generates an outgoing spike object when a spike threshold of said neuron simulation object is exceeded; and wherein, during the third simulation loop, each outgoing spike object generated by each neuron simulation object of said core simulation object is delivered to a target axon simulation object as an incoming spike object.

\* \* \* \* \*